United States Patent Office 2,930,799
Patented Mar. 29, 1960

2,930,799

BICYCLIC ANHYDRIDE OF MESO-ALPHA,ALPHA'-DITHIOADIPIC ACID AND METHOD OF MAKING THE SAME

Louis E. de Mytt, Chicago, Ill., assignor to The Gillette Company, Boston, Mass., a corporation of Delaware No Drawing. Application August 19, 1957
Serial No. 679,090

2 Claims. (Cl. 260—327)

This invention relates to a new chemical compound useful as an intermediate in the preparation of hair waving agents and pertains more specifically to the bicyclic anhydride of meso-alpha,alpha'-dithioadipic acid.

It has been found that a solid, stable bicyclic compound which is the anhydride of meso-alpha,alpha'-dithioadipic acid may be prepared by reacting the acid with a molar excess of acetyl chloride. The compound has the structure

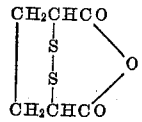

The compound may be reacted with methanol to form the monomethyl ester of meso-alpha,alpha'-dithioadipic acid, with ammonia to form the monoamide, or with a variety of amines to form substituted monoamides. The ester and amides may be reduced to the ester and amides of the corresponding meso-alpha,alpha'-dimercapto thioadipic acid which can be used for the cold permanent waving of hair.

*Example*

There was placed in a three-necked flask fitted with a condenser and a stirrer 208 g. (1 mole) of meso-alpha,alpha'-dithioadipic acid, following which 430 g. (6 moles) of acetyl chloride was rapidly introduced. The ingredients were stirred and heated at reflux temperature until solution of the acid was complete and no more hydrogen chloride was evolved. The excess acetyl chloride was removed by distillation, first at atmospheric pressure and finally at reduced pressure. The residue was cooled, whereupon it solidified; the resultant solid was dissolved in hot methanol from which it crystallized in the form of white needles melting at 76°–77° C. The anhydride product possessed the structure

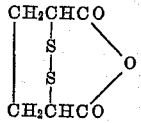

and was found to have an equivalent weight of 96.3 (calc. 95).

A solution of 190 g. (1 mole) of the anhydride product and 23 g. (1 mole) of metallic sodium in 500 ml. of methanol was heated at reflux temperature for four hours, whereupon the free methanol removed by distillation. The residue, after dissolution in water, was acidified with hydrochloric acid to cause the separation of a yellow oil. The oil was dissolved in ether, the solution dried with sodium sulfate, and the ether removed by evaporation. The residue was distilled at reduced pressure to yield the monomethyl ester of meso-alpha,alpha'-dithioadipic acid, B.P., 115°–120° C. at 0.5 mm. Hg pressure, equivalent weight found 218 (calc. 222).

The monoammonium salt of the monoamide of meso-alpha,alpha'-dithioadipic acid was prepared by mixing 19 g. (0.1 mole) of the anhydride with 50 ml. of aqua ammonia, allowing to stand overnight, and removing the excess ammonia under reduced pressure at 30° C., whereupon the monoammonium salt of the monoamide separated as a white crystalline solid melting with decomposition at 241° C.

Both the monoester and the monoammonium salt of the monoamide of the dithioadipic acid could readily be reduced to the corresponding monoester and monoamide of meso-alpha,alpha'-dimercaptoadipic acid. For example, metallic sodium was employed as the reducing agent by adding to a solution of 23 g. (0.1 mole) of the ammonium salt mentioned above in 300 ml. of liquid ammonia about 5 g. of metallic sodium, in small portions, until a blue color persisted in the solution. The excess metallic sodium was then removed by adding ammonium chloride until the blue color disappeared, whereupon the liquid ammonia solvent was removed by bubbling nitrogen through the solution. The solid residue was recrystallized from methanol, resulting in 15 g. of the monoammonium salt of the monoamide of alpha,alpha'-dimercaptoadipic acid (M.P. dec. 253° C.). Nitrogen analysis: Found 12.4%; calc. 12.6%.

Lotions for the permanent waving of hair were prepared by dissolving either the monoester or the monoamide of the dimercaptoadipic acid in water to give approximately a 6% by weight solution, the pH being adjusted to approximately 9.2 with excess ammonia. Hair could then be waved by applying the solutions to the hair, winding the saturated hair tress upon a curler and allowing to stand for about half an hour, then rinsing and neutralizing with a 1% aqueous sodium perborate solution.

Although specific embodiments of the invention have been described herein, it is not intended to limit the invention solely thereto, but to include all of the obvious variations and modifications within the spirit and scope of the appended claims.

What is claimed is:
1. The anhydride having the structure

2. The method of making the anhydride of meso-alpha,alpha'-dithioadipic acid which consists essentially of heating a mixture of said acid with a molar excess of acetyl chloride at reflux temperature and separating said anhydride from the reaction mixture.

References Cited in the file of this patent

Arne Fredga: Berichte, vol. 71, pp. 289–295 (1938).
Fieser and Fieser: Organic Chemistry, 3rd ed., Reinhold Publishing Corp., p. 88, 1956.
Fieser and Fieser: Organic Chemistry (text); 3rd edition (1956); pp. 316 and 317; Reinhold Publishing Corp., N.Y.